(12) United States Patent
Fujiwara et al.

(10) Patent No.: US 9,097,295 B2
(45) Date of Patent: Aug. 4, 2015

(54) POWER GENERATION DEVICE

(71) Applicant: JTEKT CORPORATION, Osaka-shi, Osaka (JP)

(72) Inventors: Hideki Fujiwara, Kitakatsuragi-gun (JP); Kazushige Ootsuka, Kashiwara (JP); Takafumi Uemoto, Kashiwara (JP); Nobuyuki Rito, Izumiotsu (JP)

(73) Assignee: JTEKT CORPORATION, Osaka (JP)

( * ) Notice: Subject to any disclaimer, the term of this patent is extended or adjusted under 35 U.S.C. 154(b) by 0 days.

(21) Appl. No.: 14/041,078

(22) Filed: Sep. 30, 2013

(65) Prior Publication Data
US 2014/0090945 A1    Apr. 3, 2014

(30) Foreign Application Priority Data

Oct. 3, 2012   (JP) ................................ 2012-221160

(51) Int. Cl.
| | | |
|---|---|---|
| *F03D 11/00* | (2006.01) | |
| *F16D 41/064* | (2006.01) | |
| *F03D 11/02* | (2006.01) | |
| *F16D 41/067* | (2006.01) | |

(52) U.S. Cl.
CPC .............. *F16D 41/064* (2013.01); *F03D 11/02* (2013.01); *F16D 41/067* (2013.01); *F05B 2260/4023* (2013.01); *F05B 2260/4031* (2013.01); *Y02E 10/722* (2013.01)

(58) Field of Classification Search
None
See application file for complete search history.

(56) References Cited

U.S. PATENT DOCUMENTS

| | | | | |
|---|---|---|---|---|
| 3,469,473 | A * | 9/1969 | Zaiser et al. .................. | 475/153 |
| 3,476,226 | A * | 11/1969 | Massey Roger G ............ | 192/27 |
| 3,537,555 | A * | 11/1970 | Pflugner et al. .......... | 192/45.008 |
| 4,461,957 | A | 7/1984 | Jallen | |
| 4,464,579 | A | 8/1984 | Schwarz | |
| 4,613,763 | A | 9/1986 | Swansen | |
| 6,327,957 | B1 * | 12/2001 | Carter, Sr. ....................... | 91/41 |
| 6,856,042 | B1 * | 2/2005 | Kubota .......................... | 290/55 |
| 8,151,959 | B2 * | 4/2012 | Itomi ....................... | 192/45.018 |
| 8,662,271 | B2 * | 3/2014 | Iwano et al. .................... | 192/44 |

(Continued)

FOREIGN PATENT DOCUMENTS

| | | |
|---|---|---|
| DE | 10 2009 004 991 A1 | 7/2010 |
| DE | 20 2010 012 597 U1 | 2/2011 |

(Continued)

OTHER PUBLICATIONS

Extended European Search Report issued in European Application No. 12183632.4 dated Jan. 11, 2013.

(Continued)

*Primary Examiner* — Joseph Waks
(74) *Attorney, Agent, or Firm* — Oliff PLC

(57) ABSTRACT

A one-way clutch used in a wind turbine generator connects an input rotor with an output rotor so that the input rotor and the output rotor are rotatable together with each other when a main shaft rotates in a forward direction and rotation speed of the input rotor is higher than rotation speed of the output rotor, and disconnects the input rotor and the output rotor from each other when the rotation speed of the input rotor is lower than the rotation speed of the output rotor. Further, the wind turbine generator includes a second one-way clutch that permits transmission of force caused by the rotation of the main shaft, to the input rotor when the main shaft rotates in the forward direction, and restricts the rotation of the main shaft when the main shaft tries to rotate in a reverse direction.

2 Claims, 7 Drawing Sheets

(56) References Cited

U.S. PATENT DOCUMENTS

| | | | |
|---|---|---|---|
| 2002/0125099 A1* | 9/2002 | Kurita et al. | 192/223.2 |
| 2008/0284168 A1 | 11/2008 | Arduini | |
| 2009/0278361 A1 | 11/2009 | Okubo et al. | |
| 2010/0294585 A1 | 11/2010 | Wolff et al. | |
| 2011/0077120 A1* | 3/2011 | Dirk | 475/348 |
| 2012/0020792 A1 | 1/2012 | Frank | |
| 2012/0045335 A1 | 2/2012 | Heidenreich et al. | |
| 2012/0201679 A1* | 8/2012 | Heidenreich et al. | 416/146 R |
| 2012/0237152 A1* | 9/2012 | Wheals | 384/548 |
| 2013/0278100 A1* | 10/2013 | Fujiwara | 310/90 |
| 2013/0283949 A1* | 10/2013 | Fujiwara | 74/405 |

FOREIGN PATENT DOCUMENTS

| | | | | |
|---|---|---|---|---|
| EP | 2 302 257 A2 | | 3/2011 | |
| JP | A-6-307327 | | 11/1994 | |
| JP | A-2006-250034 | | 9/2006 | |
| JP | A-2007-232186 | | 9/2007 | |
| JP | 2013238309 A | * | 11/2013 | |
| SU | 1 574 899 A1 | | 6/1990 | |
| WO | WO 2005012763 A1 | * | 2/2005 | F16H 3/72 |
| WO | WO 2012/023994 A1 | | 2/2012 | |

OTHER PUBLICATIONS

U.S. Appl. No. 13/606,695 filed on Sep. 7, 2012 in the name of Fujiwara et al.
Extended European Search Report issued in European Application No. 13 18 7006.
Oct. 15, 2014 Office Action issue in U.S. Appl. No. 13/606,695.
Jul. 1, 2014 Office Action issued in U.S. Appl. No. 13/606,695.
U.S. Appl. No. 13/861,479 filed Apr. 12, 2013 in the name of Fujiwara.

* cited by examiner

POWER GENERATION DEVICE

INCORPORATION BY REFERENCE

The present application claims priority to Japanese Patent Application No. 2012-221160, filed on Oct. 3, 2012, the entire disclosure of which is hereby incorporated by reference in its entirety.

BACKGROUND OF THE INVENTION

1. Field of the Invention

The invention relates to a power generation device that drives a power generator by increasing speed of rotation of a main shaft due to an external force, by use of a speed increaser.

2. Description of Related Art

Conventionally, as a wind turbine generator in which a main shaft is rotated to generate power when blades receive wind, there has been a wind turbine generator that includes a speed increaser. The speed increaser drives a power generator by increasing speed of rotation of the main shaft. As shown in FIG. 7, this type of speed increaser 202 includes a planet gear mechanism 203, a high-speed range gear mechanism 204, and an output shaft 205. Rotation of a main shaft 200 is input to the planet gear mechanism 203 that then increases a speed of the rotation of the main shaft 200. The rotation, speed of which has been increased by the planet gear mechanism 203, is input to the high-speed range gear mechanism 204 that further increases speed of the rotation. The output shaft 205 outputs rotation, speed of which has been increased by the high-speed range gear mechanism 204. A drive shaft 212 of a power generator is connected to the output shaft 205, and a rotor (not shown) of the power generator is fitted to the drive shaft 212.

In the planet gear mechanism 203, upon rotation of an input shaft 203a that is connected to the main shaft 200, to which blades (not shown) are fitted, so that the input shaft 203a is rotatable together with the main shaft 200, a planet carrier 203b rotates. Thus, a sun gear 203d is rotated at increased speed through a planet gear 203c. Then, this rotation is transmitted to a low-speed shaft 204a of the high-speed range gear mechanism 204. In the high-speed range gear mechanism 204, as the low-speed shaft 204a rotates, an intermediate shaft 204d is rotated at increased speed through a low-speed gear 204b and a first intermediate gear 204c, and further, the output shaft 205 is rotated at increased speed through a second intermediate gear 204e and a high-speed gear 204f. In the speed increaser 202, a number of roller bearings 206 to 211 are used as bearings that support the low-speed shaft 204a, the intermediate shaft 204d, and the output shaft 205, respectively, so that the low-speed shaft 204a, the intermediate shaft 204d, and the output shaft 205 are rotatable (for example, see Japanese Patent Application Publication No. 2007-232186 (JP 2007-232186 A)).

In the conventional wind turbine generator, there has been a problem that smearing (a phenomena in which seizure of surface layers occurs) is caused on rolling contact surfaces of rollers, and raceway surfaces of rotating rings in the roller bearings 210 and 211 supporting the output shaft 205 that rotate at high speed, and service lives of the roller bearings 210 and 211 are shortened. Smearing described above is thought to occur not only in the wind turbine generator, but also on roller bearings provided in a power generation device of a different model, in which a power generator is driven while speed of rotation of a main shaft is increased by using a speed increaser.

The present inventors have pursued extensive studies on a mechanism by which smearing occurs. As a result, the following findings have been obtained. When rotation speed of a main shaft is decreased sharply due to a reduction of external force (force of wind), rotation speed of a drive shaft of a power generator that rotates together with a rotor is prone to exceed rotation speed of an output shaft of a speed increaser due to inertia of the rotor of the power generator having a large weight. Accordingly, so-called torque release (load release) occurs in the output shaft, and a radial load acting on a roller bearing that supports the output shaft is reduced due to the torque release. As a result, in the roller bearing, sliding friction resistance and the like between the roller and a cage that retains the roller becomes larger than rolling friction resistance between the roller and a rotating ring, and accordingly, rotation of the roller about its own axis is delayed. Then, when rotation speed of the main shaft is increased sharply from this state due to an increase in external force (force of wind), inertia torque of the rotor due to increased speed is applied to the output shaft, and a radial load acting on the roller bearing that supports the output shaft is increased sharply. In that moment (in a transitional state), sliding occurs between the roller and the rotating ring in a state where a high load is acting on the roller, and temperature of a contact surface between the roller and the rotating ring is increased, thereby causing smearing. The present invention has been completed based on the findings.

SUMMARY OF THE INVENTION

An object of the present invention is to provide a power generation device in which smearing is effectively restrained from occurring in a roller bearing that supports an output shaft of a speed increaser.

According to an aspect of the present invention, a power generation device includes a main shaft rotated by external force; a speed increaser including a rotation transmission mechanism that increases speed of rotation of the main shaft, an output shaft that outputs rotation, speed of which has been increased by the rotation transmission mechanism, and a roller bearing that supports the output shaft so that the output shaft is rotatable; a power generator including a drive shaft that rotates when receiving the rotation of the output shaft as an input, and a rotor that rotates together with the drive shaft, the power generator generating power with rotation of the rotor; an input rotor provided on the output shaft so as to be rotatable together with the output shaft; an output rotor that is provided on the drive shaft so as to be rotatable together with the drive shaft, and that is arranged radially inside or radially outside the input rotor concentrically with the input rotor; a clutch that is arranged between the input rotor and the output rotor, connects the input rotor with the output rotor so that the input rotor and the output rotor are rotatable together with each other when the main shaft rotates in a forward direction and rotation speed of the input rotor is higher than rotation speed of the output rotor, and disconnects the input rotor and the output rotor from each other when the rotation speed of the input rotor is lower than the rotation speed of the output rotor; and a reverse rotation prevention device that permits transmission of force, which is caused by the rotation of the main shaft, to the input rotor when the main shaft rotates in the forward direction, and restricts the rotation of the main shaft when the main shaft tries to rotate in a reverse direction.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
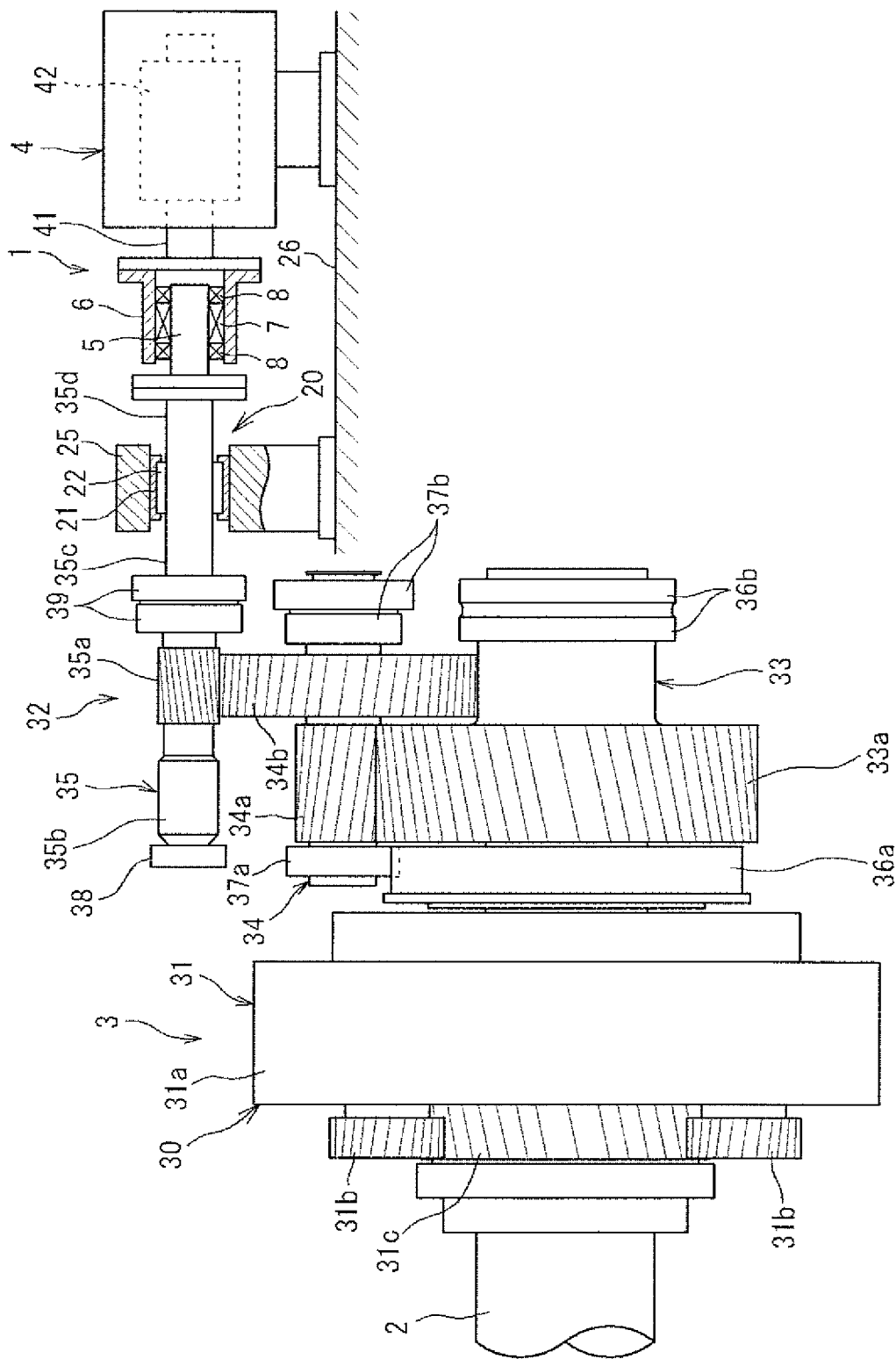
FIG. 1 is a schematic side view showing a wind turbine generator according to an embodiment of the present invention.

An embodiment of the present invention will be described with reference to the accompanying drawings. FIG. 1 is a schematic side view showing a wind turbine generator according to an embodiment of the present invention. The wind turbine generator (power generation device) 1 includes a main shaft 2, a speed increaser 3, and a power generator 4. The main shaft 2 rotates when receiving force of wind (external force). The speed increaser 3 is connected to the main shaft 2. The power generator 4 is connected to the speed increaser 3. Speed of rotation of the main shaft 2 is increased by the speed increaser 3, and the rotation at increased speed drives the power generator 4.

Blades (not shown) are fitted to a distal end portion of the main shaft 2 so that the blades are rotatable together with the main shaft 2, and the blades rotate the main shaft 2 when the blades receives force of wind. The power generator 4 includes a drive shaft 41, a rotor 42, a stator (not shown), and the like. The drive shaft 41 rotates when rotation of an output shaft 35, speed of which has been increased by the speed increaser 3, is input to the drive shaft 41. The rotor 42 is provided in the power generator 4. The rotor 42 is connected to the drive shaft 41 so as to be rotatable together with the drive shaft 41. Power is generated when the rotor 42 rotates together with the drive shaft 41.

The speed increaser 3 includes a gear mechanism (a rotation transmission mechanism) 30, and the output shaft 35. Rotation of the main shaft 2 is input to the gear mechanism 30 that then increases speed of the rotation. The output shaft 35 outputs rotation, speed of which has been increased by the gear mechanism 30. The gear mechanism 30 includes a planet gear mechanism 31, and a high-speed range gear mechanism 32. Rotation, speed of which has been increased by the planet gear mechanism 31, is input to the high-speed range gear mechanism 32 that then further increases speed of the rotation. The planet gear mechanism 31 includes an internal gear (ring gear) 31a, a plurality of planet gears 31b, and a sun gear 31c. The planet gears 31b are retained by a planet carrier (not shown) that is connected to the main shaft 2 so as to be rotatable together with the main shaft 2. The sun gear 31c meshes with the planet gears 31b. Thus, when the planet carrier rotates together with the main shaft 2, the sun gear 31c rotates through the planet gears 31b, and the rotation is transmitted to a low-speed shaft 33 of the high-speed range gear mechanism 32.

The high-speed range gear mechanism 32 includes the low-speed shaft 33, an intermediate shaft 34, and a high-speed gear 35a. The low-speed shaft 33 has a low-speed gear 33a. The intermediate shaft 34 includes a first intermediate gear 34a and a second intermediate gear 34b. The high-speed gear 35a rotates together with the output shaft 35. The low-speed shaft 33 is constituted by a large-sized rotary shaft having a diameter of, for example, approximately 1 meter, and is arranged concentrically with the main shaft 2. Both axial end portions of the low-speed shaft 33 are supported by roller bearings 36a and 36b, respectively, so that the low-speed shaft 33 is rotatable. The intermediate shaft 34 is arranged above the low-speed shaft 33, and both axial end portions of the intermediate shaft 34 are supported by roller bearings 37a and 37b, respectively, so that the intermediate shaft 34 is rotatable. The first intermediate gear 34a of the intermediate shaft 34 meshes with the low-speed gear 33a, and the second intermediate gear 34b meshes with the high-speed gear 35a. The output shaft 35 is arranged above the intermediate shaft 34, and outputs running torque. One axial end portion 35b and an intermediate portion 35c of the output shaft 35 are supported by roller bearings 38 and 39, respectively, so that the one axial end portion 35b and the intermediate portion 35c are rotatable. Thus, the speed increaser 3 includes a number of roller bearings such as the roller bearings 38 and 39 that support the output shaft 35 so that the output shaft 35 is rotatable.

With the configuration described above, speed of rotation of the main shaft 2 is increased in three steps by a gear ratio of the planet gear mechanism 31, a gear ratio between the low-speed gear 33a and the first intermediate gear 34a, and a gear ratio between the second intermediate gear 34b and the high-speed gear 35a. It is possible to output running torque from an output end portion 35d of the output shaft 35. Due to the output, the drive shaft 41 of the power generator 4 is driven to rotate. Thus, speed of rotation of the main shaft 2 due to force of wind is increased in three steps by the speed increaser 3, so that the power generator 4 is driven.

Figure 2:
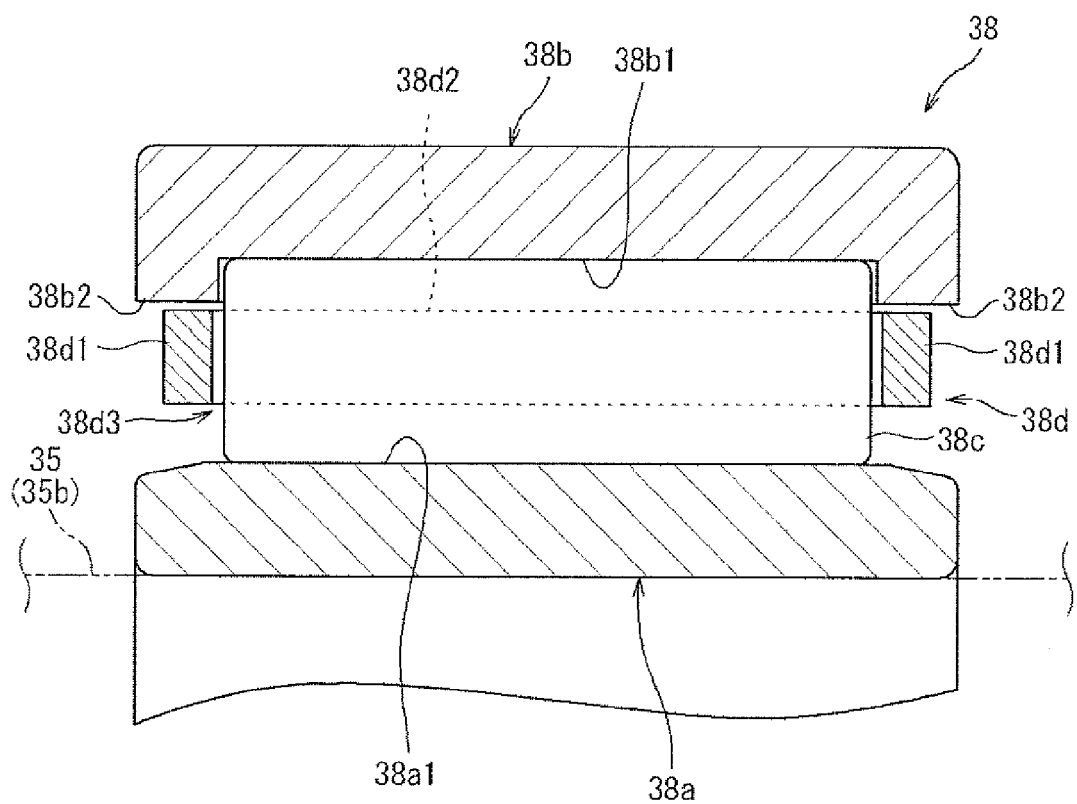
FIG. 2 is a longitudinal sectional view showing a roller bearing of a speed increaser in the wind turbine generator.

FIG. 2 is a longitudinal sectional view showing the roller bearing 38 that supports the one end portion 35b of the output shaft 35. In FIG. 2, the roller bearing 38 is formed of a cylindrical roller bearing. The roller bearing 38 includes an inner ring 38a, an outer ring 38b, a plurality of cylindrical rollers 38c, and an annular cage 38d. The inner ring 38a is fitted and fixed to an outer periphery of the output shaft 35. The outer ring 38b is fixed to a housing (now shown) of the speed increaser 3. The cylindrical rollers 38c are arranged between the inner ring 38a and the outer ring 38b so as to be able to roll. The cage 38d retains the cylindrical rollers 38c at given intervals along a circumferential direction. The inner ring 38a, the outer ring 38b, and the cylindrical rollers 38c are formed of for example, bearing steel, and the cage 38d is formed of, for example, copper alloy.

An inner ring raceway surface 38a1 is formed in an axial center portion of an outer periphery of the inner ring 38a. The outer ring 38b is arranged concentrically with the inner ring 38a. An outer ring raceway surface 38b1 is formed in an axial center portion of an inner periphery of the outer ring 38h. The outer ring 38b has a pair of outer ring rib portions 38b2 formed on respective axial sides of the outer ring raceway surface 38b1. The outer ring raceway surface 38b1 is arranged so as to face the inner ring raceway surface 38a1. The outer ring rib portions 38b2 are formed so as to project toward a radially inner side from respective axial end portions of the inner periphery of the outer ring 38b, and end surfaces of the cylindrical rollers 38c come into sliding contact with the outer ring rib portions 38b2.

The cylindrical rollers 38c are arranged between the inner ring raceway surface 38a1 of the inner ring 38a, and the outer ring raceway surface 38b1 of the outer ring 38b, and the cylindrical rollers 38c are able to roll along the raceway surfaces. The cage 38d includes a pair of circular portions 38d1, and a plurality of bar portions 38d2. The circular portions 38d1 are arranged so as to be separated from each other in an axial direction. The bar portions 38d2 are arranged at equal intervals along a circumferential direction of the circular portions 38d1, and connect both of the circular portions 38d1 with each other. Each of pockets 38d3 is formed among the pair of circular portions 38d1 and the bar portions 38d2 that are adjacent to each other in the circumferential direction. The cylindrical rollers 38c are provided in the pockets 38d3.

In FIG. 1, the wind turbine generator 1 further includes an input rotor 5, an output rotor 6, a clutch 7, a pair of roller bearings 8, and a reverse rotation prevention device 20. The input rotor 5 is provided on the output shaft 35 of the speed increaser 3 so as to be rotatable together with the output shaft 35. The output rotor 6 is provided on the drive shaft 41 of the power generator 4 so as to be rotatable together with the drive shaft 41. The clutch 7 is arranged between the input rotor 5 and the output rotor 6. The roller bearings 8 are arranged on respective axial ends of the clutch 7. The reverse rotation prevention device 20 is arranged between the speed increaser 3 and the input rotor 5. In this embodiment, the clutch 7 arranged between the input rotor 5 and the output rotor 6 is a one-way clutch. The reverse rotation prevention device 20 is also a one-way clutch. Thus, the clutch 7 will be referred to as a first one-way clutch 7, and the reverse rotation prevention device 20 will be referred to as a second one-way clutch 20.

A configuration of the first one-way clutch 7 will be described later. The first one-way clutch 7 is able to transmit rotation of the output shaft 35 to the drive shaft 41 through the input rotor 5 and the output rotor 6 in a case where the blades (not shown) and the main shaft 2 "rotate in a forward direction".

A configuration of the second one-way clutch 20 will be described later. In a case where the blades (not shown) and the main shaft 2 "rotate in the forward direction" due to wind blowing in one direction, the second one-way clutch 20 is able to transmit force (torque) caused by the rotation of the blades and the main shaft 2, to the input rotor 5. However, when a direction of the wind is suddenly changed to a reverse direction, and accordingly the blades (not shown) and the main shaft 2 are stopped and then try to "rotate in a reverse direction", the second one-way clutch 20 restricts (precludes) the rotation of the blades and the main shaft 2.

Figure 3:
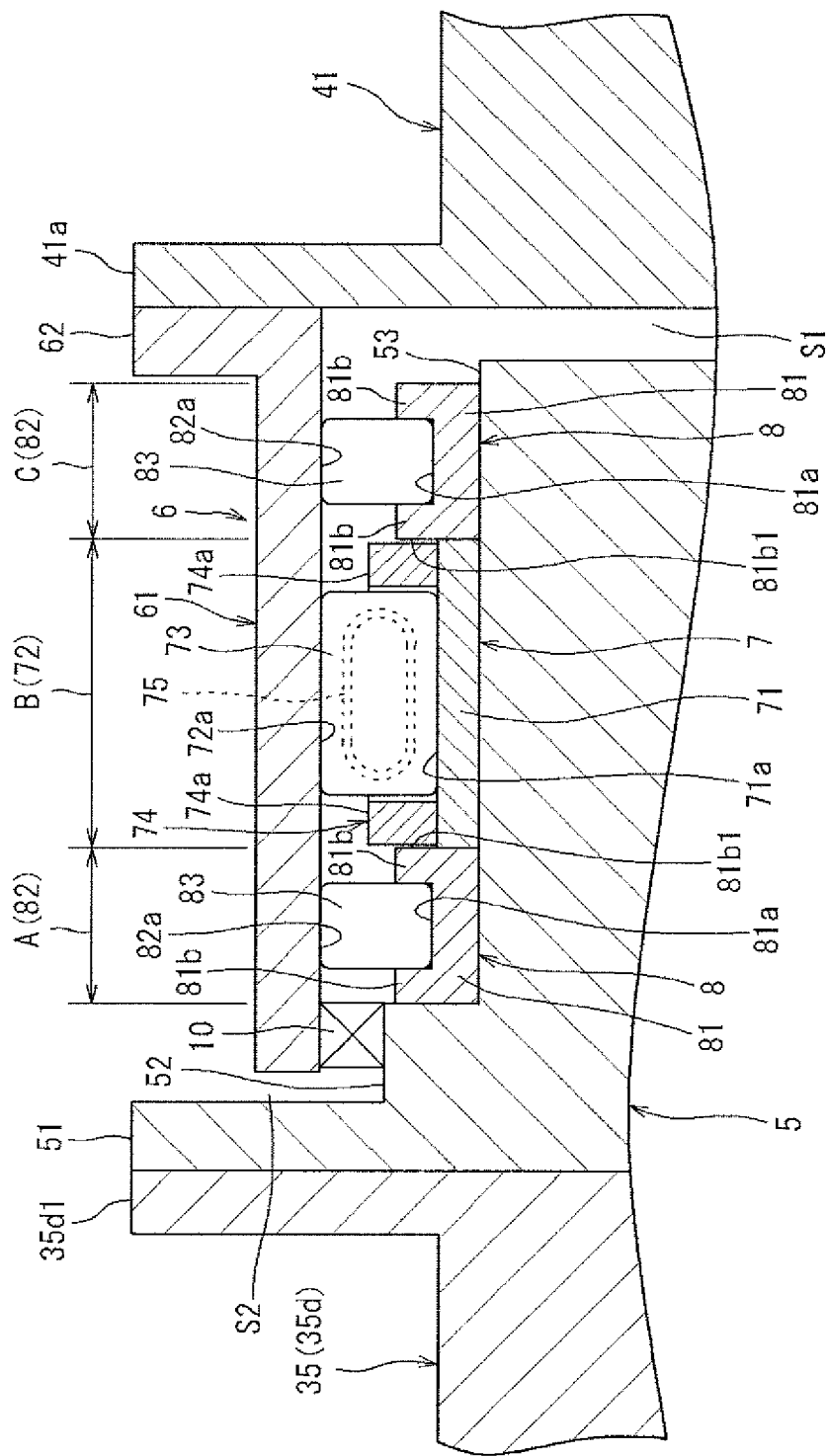
FIG. 3 is a sectional view showing a connecting portion between an output shaft of the speed increaser and a drive shaft of a power generator in the wind turbine generator.

FIG. 3 is a sectional view showing a connecting portion between the output shaft 35 of the speed increaser 3 and the drive shaft 41 of the power generator 4. The input rotor 5 is provided concentrically with the output shaft 35, and has a flange portion 51, a large-diameter portion 52, and a small-diameter portion 53 in this order from one axial end portion (a left end portion in FIG. 3) toward the other axial end portion (a right end portion in FIG. 3). The flange portion 51 is formed so as to extend to a position radially outside an outer peripheral surface of the large-diameter portion 52, and is fixed to the output end portion 35d of the output shaft 35 in a detachable manner. More specifically, in a state where the flange portion 51 abuts on a flange portion 35d1 formed in the output end portion 35d, the flange portion 51 is fastened and fixed to the flange portion 35d1 by bolts and nuts (not shown). A gap S1 is provided between an end surface of the small-diameter portion 53 and an end surface of a flange portion 41a of the drive shaft 41.

In this embodiment, the output rotor 6 is provided radially outside the input rotor 5 (the large-diameter portion 52 and the small-diameter portion 53) concentrically with the input rotor 5. The output rotor 6 has a cylindrical portion 61 and a flange portion 62. The flange portion 62 is formed in the other axial end portion (a right end portion in FIG. 3) of the cylindrical portion 61. The flange portion 62 is formed so as to extend to a position radially outside an outer peripheral surface of the cylindrical portion 61. The flange portion 62 is fixed to one end portion of the drive shaft 41 in a detachable manner. More specifically, in a state where the flange portion 62 abuts on the flange portion 41a formed in one end portion of the drive shaft 41, the flange portion 62 is fastened and fixed to the flange portion 41a by bolts and nuts (not shown).

An inner peripheral surface of the cylindrical portion 61 is a cylindrical surface. An annular seal member 10 for sealing an annular space between the cylindrical portion 61 and the small-diameter portion 53 of the input rotor 5 is provided in a clearance between an inner peripheral surface of one axial end portion (a left side portion in FIG. 3) of the cylindrical portion 61 and an outer peripheral surface of the large-diameter portion 52 of the input rotor 5. A gap S2 is provided between an end surface of the one end portion side of the cylindrical portion 61, and an end surface of the flange portion 51 of the input rotor 5, which faces the above-described end surface. Thus, the output rotor 6 is able to move in an axial direction with respect to the input rotor 5 in a state where the output rotor 6 is separated from the drive shaft 41.

Figure 4:
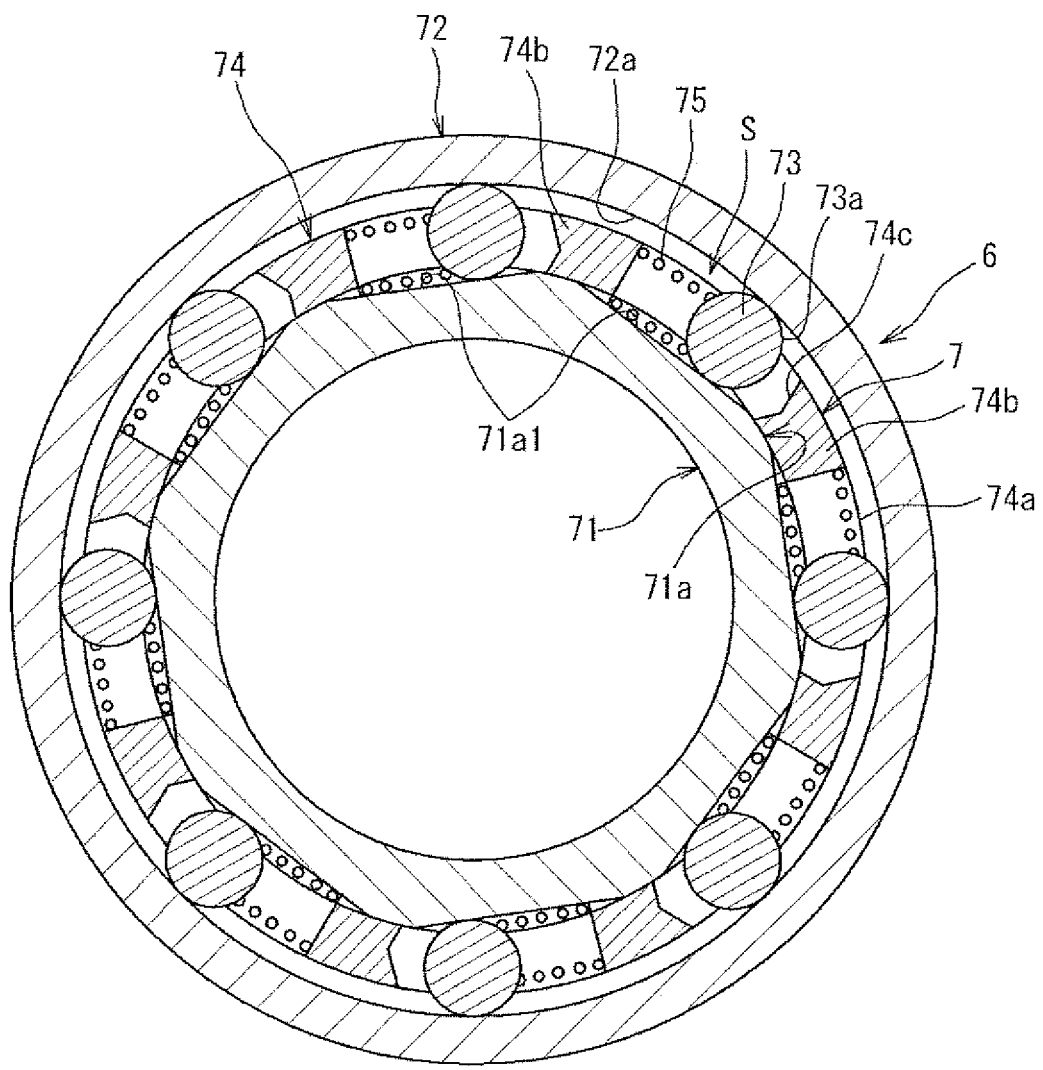
FIG. 4 is a cross sectional view showing an output rotor and a first one-way clutch provided in the wind turbine generator.

FIG. 4 is a cross sectional view showing the output rotor 6 and the one-way clutch 7. In FIG. 3 and FIG. 4, the one-way clutch 7 includes an inner ring 71, an outer ring 72, and a plurality of rollers 73. The rollers 73 are arranged between an outer peripheral surface 71a of the inner ring 71 and an inner peripheral surface 72a of the outer ring 72. The inner ring 71 is fitted and fixed onto an outer periphery of an axial center portion of the small-diameter portion 53 of the input rotor 5, and rotates together with the small-diameter portion 53. An area B in an axial center portion of the cylindrical portion 61 of the output rotor 6 serves as the outer ring 72 of the one-way clutch 7. Therefore, the inner peripheral surface 72a is formed in an inner peripheral surface of the area B of the cylindrical portion 61. The rollers 73 have a columnar shape, and in this embodiment, the eight rollers 73 are arranged in the circumferential direction. Further, the one-way clutch 7 includes an annular cage 74 and a plurality of elastic members 75. The cage 74 retains the rollers 73 at given intervals along the circumferential direction. The elastic members 75 elastically urge the rollers 73 in one direction, respectively.

The cage 74 has a pair of circular portions 74a that face each other in the axial direction, and a plurality of bar portions 74b that connects both of the circular portions 74a with each other. The bar portions 74b extend in the axial direction between both of the circular portion 74a, and are arranged at equal intervals in the circumferential direction. Each of pockets 74c is formed among the circular portions 74a and the bar portions 74b that are adjacent to each other in the circumferential direction, and the rollers 73 are housed in the pockets 74c, respectively. Each of the elastic members 75 is made of a compression coil spring. The elastic members 75 are housed in the pockets 74c of the cage 74, respectively, and are fitted to the bar portions 74b.

In FIG. 4, flat cam surfaces 71a1, the number of which is the same as the number of the rollers 73, are formed in the outer peripheral surface 71a of the inner ring 71. That is, the eight flat cam surfaces 71a1 are formed in the outer peripheral surface 71a. On the other hand, the inner peripheral surface 72a of the outer ring 72 is a cylindrical surface. Thus, a plurality of (eight) wedge-shaped spaces S is formed in the circumferential direction between the cam surfaces 71a1 and respective portions of the inner peripheral surface 72a radially outside the cam surfaces 71a1. The rollers 73 are arranged in the wedge-shaped spaces S, respectively, and the elastic members 75 urge the rollers 73 in a direction in which the wedge-shaped spaces S are narrowed. Outer peripheral surfaces of the rollers 73 are contact surfaces 73a that come into contact with the cam surfaces 71a1 and the inner peripheral surface 72a, and the contact surfaces 73a are formed to extend straight in a width direction (the axial direction). A lubricant (grease) is provided between the inner and outer rings 71 and 72. The lubricant is unlikely to be affected by temperature changes as ester is used as base oil and a urea-based thickener is used.

In the wind turbine generator 1 (see FIG. 1) having the above-described configuration, when force of wind that is received by the blades (not shown) increases, and therefore, rotation speed of the main shaft 2 that rotates in the forward direction is increased, rotation speed of the output shaft 35, which rotates at speed increased by the speed increaser 3, is further increased. Thus, the input rotor 5 is accelerated by the output shaft 35, and the output shaft 35 and the input rotor 5 rotate together with each other at high speed. Then, in the first one-way clutch 7, when rotation speed of the input rotor 5 is increased and becomes higher than rotation speed of the output rotor 6 in FIG. 3 and FIG. 4, the inner ring 71 tries to rotate in one direction (a counter-clockwise direction in FIG. 4) with respect to the outer ring 72. In this case, the rollers 73 are slightly moved by urging force of the elastic members 75 in a direction in which the wedge-shaped spaces S are narrowed, the contact surfaces 73a of the rollers 73 are pressed onto the cam surfaces 71a1 of the inner ring 71 and the inner peripheral surface 72a of the outer ring 72, and the rollers 73 are engaged with the inner and outer rings 71 and 72. Thus, the inner and outer rings 71 and 72 are rotatable together with each other in the one direction (the counter-clockwise direction in FIG. 4). That is, the input rotor 5 and the output rotor 6 are connected to each other so that the input rotor 5 and the output rotor 6 are rotatable together with each other. Accordingly, torque is applied to the drive shaft 41 from the output rotor 6, and the rotor 42 (see FIG. 1) rotates together with the drive shaft 41 in the power generator 4, and thus, power is generated.

In a case where the input rotor 5 rotates at constant speed after rotating at increased speed, and rotation speed of the input rotor 5 becomes the same as rotation speed of the output rotor 6, the rollers 73 are kept engaged with the inner and outer rings 71 and 72. Thus, in the one-way clutch 7, the inner and outer rings 71 and 72 are kept rotating together with each other in the one direction, and the input rotor 5 and the output rotor 6 continue to rotate together with each other, and thus, power is generated.

Meanwhile, speed of rotation of the input rotor 5 is reduced, for example, when force of wind received by the blades (not shown) is weakened, rotation speed of the main shaft 2 rotating in the forward direction is reduced, and rotation speed of the output shaft 35 rotating at speed increased by the speed increaser 3 is thus reduced. On the other hand, rotation speed of the drive shaft 41 and the output rotor 6 is not reduced much due to inertia force of the rotor 42. In the case where rotation speed of the input rotor 5 is reduced and becomes lower than rotation speed of the output rotor 6 as described above, the inner ring 71 in the one-way clutch 7 rotates in a reverse direction (a clockwise direction in FIG. 4) with respect to the outer ring 72. In this case, the rollers 73 are slightly moved against the urging force of the elastic members 75, in a direction in which the wedge-shaped space S expands, and therefore, the rollers 73 are disengaged from the inner and outer rings 71 and 72. Since the rollers 73 are disengaged as described above, the input rotor 5 and the output rotor 6 are disconnected from each other. Even in the case where the input rotor 5 and the output rotor 6 are disconnected from each other as described above, the rotor 42 continues to rotate due to inertia force in the power generator 4, and power is generated.

Also, in FIG. 3, the pair of roller bearings 8 is arranged between the small-diameter portion 53 of the input rotor 5, and the cylindrical portion 61 of the output rotor 6. The roller bearings 8 support the input rotor 5 and the output rotor 6 so that the input rotor 5 and the output rotor 6 are rotatable with respect to each other. The roller bearings 8 are arranged adjacent to respective axial sides of the one-way clutch 7. The roller bearings 8 are able to abut on respective axial end surfaces of the cage 74 of the one-way clutch 7.

The roller bearing 8 includes an inner ring 81, an outer ring 82, and a plurality of cylindrical rollers 83. The cylindrical rollers 83 are arranged between the inner ring 81 and the outer ring 82 so as to be able to roll. The roller bearing 8 is constituted by a cylindrical roller bearing. The inner ring 81 has an inner ring raceway surface 81a formed in an outer periphery, and inner ring rib portions 81b. The inner ring rib portions 81b are formed at respective axial sides of the inner ring raceway surface 81a, and the inner ring rib portions 81b project toward a radially outer side. Both end surfaces of the cylindrical roller 83 come into sliding contact with inner side surfaces of the inner ring rib portions 81b, respectively. An outer side surface 81b1 of the inner ring rib portion 81b adjacent to the one-way clutch 7 serves as an abutment surface on which an outer side surface of the circular portion 74a abuts. The outer side surface of the circular portion 74a is an axial end surface of the cage 74 of the one-way clutch 7.

In this embodiment, an area A and an area C in respective axial end portions of the cylindrical portion 61 of the output rotor 6 serve as outer rings 82 of the roller bearings 8. Outer ring raceway surfaces 82a of the outer rings 82 are formed in inner peripheral surfaces of the areas A and C, respectively. The cylindrical rollers 83 are arranged between the outer ring raceway surfaces 82a and the inner ring raceway surfaces 81a so as to be able to roll.

In the wind turbine generator 1 having the above-described configuration (see FIG. 1), the one-way clutch 7, which is arranged between the input rotor 5 rotating together with the output shaft 35 of the speed increaser 3, and the output rotor 6 rotating together with the drive shaft 41 of the power generator 4, enables the input rotor 5 and the output rotor 6 to be disconnected from each other when rotation speed of the input rotor 5 is lower than rotation speed of the output rotor 6. In other words, it is possible to prevent transmission of inertial rotation of the rotor 42 of the power generator 4 to the output shaft 35 through the drive shaft 41, when rotation speed of the output shaft 35 is decreased sharply through the main shaft 2 due to a decrease in force of wind.

Therefore, it is possible to restrain a reduction in radial load acting on the roller bearing 38 (see FIG. 2) that supports the output shaft 35, and delay in rotation of each of the cylindrical rollers 38c about its own axis associated with the reduction in the radial load, in other words, it is possible to restrain sliding between the rollers 38c, and the inner ring 38a and the outer ring 38b. Hence, even when a high load is applied to the cylindrical rollers 38c as rotation speed of the main shaft 2 increases sharply from this state due to a change in force of wind, contact surfaces of the cylindrical rollers 38c, which come into contact with the inner ring 38a, are unlikely to slide. Therefore, it is possible to effectively restrain smearing from occurring in the roller bearing 38.

Moreover, it is possible to prevent inertial rotation of the rotor 42 from being transmitted to the output shaft 35. Thus, it is possible to reduce loads that act on the roller bearings 36a and 36b, 37a, 37b, 38, 39 and the like of the speed increaser 3. Thus, it is possible to downsize each of the gears 31b and 31c of the planet gear mechanism 31, each of the shafts 33 to 35 and roller bearings 36a, 36b, 37a, 37b, 38, and 39 of the of the high-speed range gear mechanism 32. As a result, it is possible to reduce a weight of the speed increaser 3 and manufacture the speed increaser 3 at low cost. Further, by disconnecting the input rotor 5 and the output rotor 6 from each other, the rotor 42 of the power generator 4 continues to rotate by inertia without sudden speed drop, and thus, average rotation speed of the rotor 42 is increased. This makes it possible to improve power generation efficiency of the power generator 4.

The roller bearings 8 are arranged between the input rotor 5 and the output rotor 6, and support the input rotor 5 and the output rotor 6 so that the input rotor 5 and the output rotor 6 are rotatable with respect to each other. In the one-way clutch 7, when clearances are formed between the rollers 73 and the inner and outer rings 71 and 72 in the wedge-shaped spaces S due to disengagement of the rollers 73 from the inner and outer rings 71 and 72, it is possible to prevent the input rotor 5 and the output rotor 6 from being moved radially with respect to each other, by the roller bearings 8. Therefore, it is possible to prevent backlash of the input rotor 5 and the output rotor 6 in a radial direction during an operation of the wind turbine generator 1.

Figure 5:
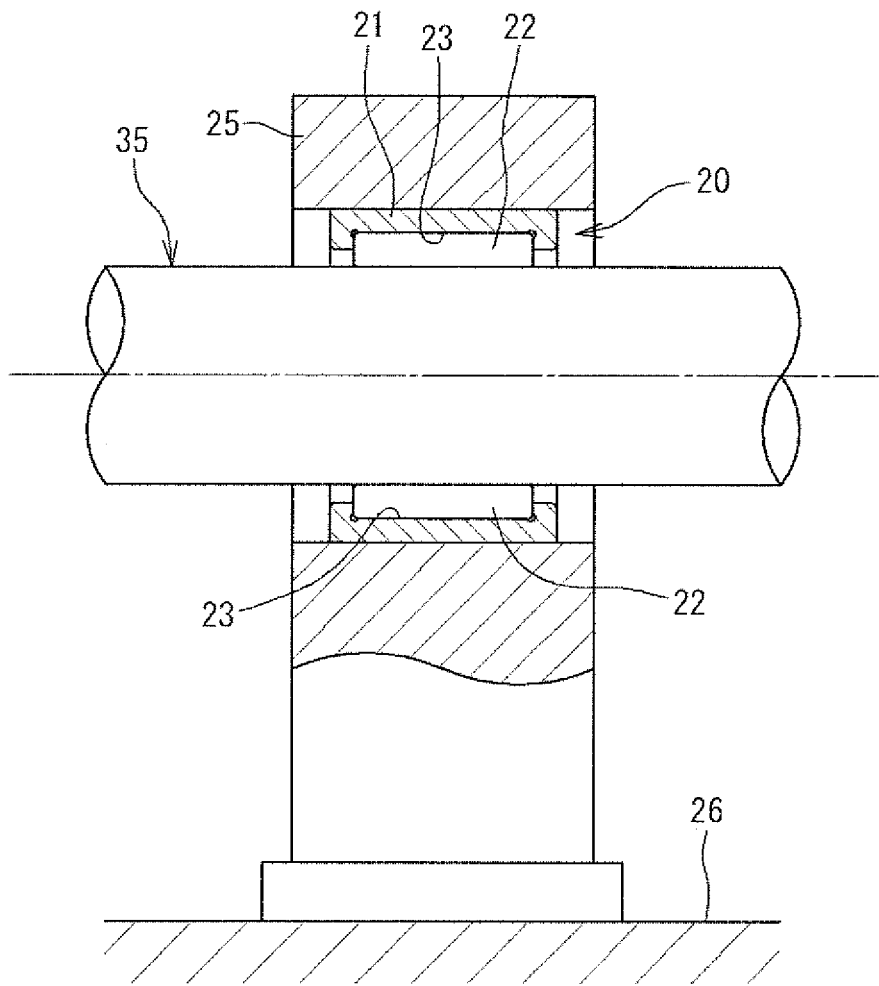
FIG. 5 is a longitudinal sectional view showing a second one-way clutch provided in the wind turbine generator, and an area near the second one-way clutch.
Figure 6:
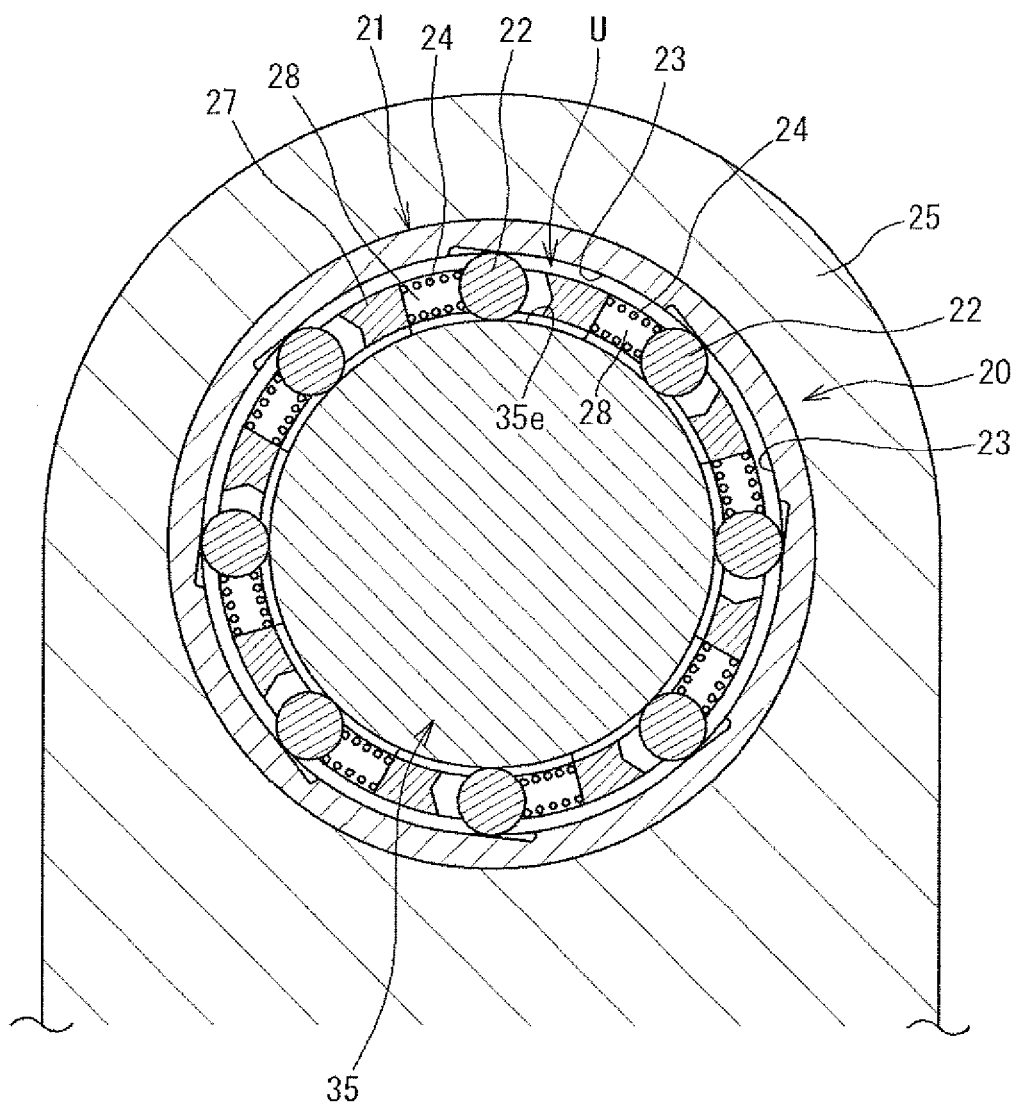
FIG. 6 is a cross sectional view showing the second one-way clutch provided in the wind turbine generator.
Figure 7:
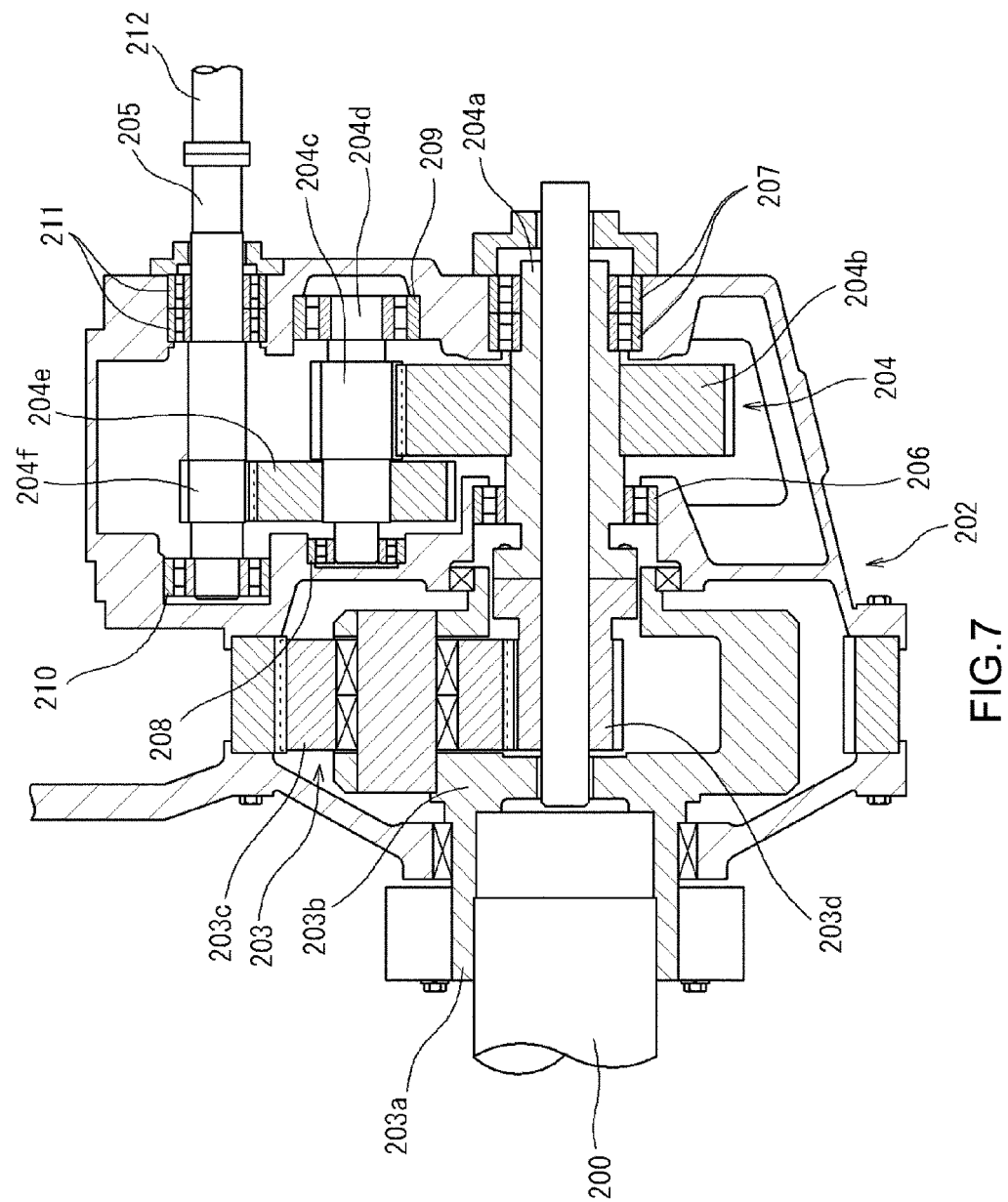
FIG. 7 is a sectional view showing a conventional speed increaser.

Next, the second one-way clutch 20 will be described with reference to FIG. 1, FIG. 5, and FIG. 6. FIG. 5 is a longitudinal sectional view showing the second one-way clutch 20 and an area near the second one-way clutch 20, and FIG. 6 is a cross sectional view of the second one-way clutch 20 and the area near the second one-way clutch 20. The second one-way clutch 20 includes an outer ring member 21, and a plurality of rollers 22. The outer ring member 21 is provided radially outside the output shaft 35 concentrically with the output shaft 35.

The outer ring member 21 is provided in a state of being stored in a bracket 25, and the bracket 25 is fixed to a floor 26 of a power generator room (see FIG. 1) for the wind turbine generator 1. As shown in FIG. 1, the floor 26 is a structure at which the power generator 4 is fixed and installed, in the power generator room. The speed increaser 3 may be fixed to the floor 26. Therefore, the outer ring member 21 is fixed to the floor 26 of the power generator room through the bracket 25, and force acting on the outer ring member 21 is transmitted to the floor 26 through the bracket 25.

In FIG. 6, a plurality of cum surfaces 23 is formed at equal intervals in an inner peripheral surface of the outer ring member 21. An outer peripheral surface 35e of the output shaft 35 is a cylindrical surface. A wedge-shaped space U is formed between the outer peripheral surface 35e of the output shaft 35 and each of the cum surfaces 23. One of the rollers 22 is provided in each of the wedge-shaped spaces U. The rollers 22 are cylindrical rollers.

The second one-way clutch 20 further includes an annular cage 27, and elastic members 24. The cage 27 retains the rollers 22 at given intervals along the circumferential direction. The elastic members 24 elastically urge the rollers 22 in one direction. The cage 27 and the elastic members 24 have configurations similar to those of the cage 74 and the elastic members 75 of the first one-way clutch 7 shown in FIG. 4, and the description of the cage 27 and the elastic members 24 will be thus omitted.

With the second one-way clutch 20, in a state where the output shaft 35, speed of which has been increased by the speed increaser 3, rotates in one direction (the counter-clockwise direction in FIG. 6) with respect to the outer ring member 21 due to the rotation of the main shaft 2 (see FIG. 1) in the forward direction, each of the rollers 22 slightly moves in a direction in which the wedge-shaped space U expands, against urging force of the elastic members 24. Thus, each of the rollers 22 is not engaged with the outer peripheral surface 35e of the output shaft 35 and the cum surface 23 of the outer ring member 21, and the output shaft 35 is able to rotate freely in one direction (the counter-clockwise direction in FIG. 6). As a result, in FIG. 1, the drive shaft 41, which has received torque from the output shaft 35 through the input rotor 5, the first one-way clutch 7, and the output rotor 6, is able to rotate, and power is generated in the power generator 4.

On the other hand, when the main shaft 2 (see FIG. 1) tries to rotate in the reverse direction, the output shaft 35, speed of which has been increased by the speed increaser 3, tries to rotate in the other direction (the clockwise direction in FIG. 6) with respect to the outer ring member 21. Thus, each of the rollers 22 slightly moves due to urging force of the elastic member 24 in a direction in which the wedge-shaped space U is narrowed, is pressed onto the outer peripheral surface 35e of the output shaft 35 and the cum surface 23 of the outer ring member 21, and is engaged with a part of the outer peripheral surface 35e and the cum surface 23. In other words, each of the rollers 22 is caught in a narrow area of the wedge-shaped space U. Since the outer ring member 21 is fixed to the floor 26 through the bracket 25, rotation of the output shaft 35 in the other direction (the clockwise direction in FIG. 6) with respect to the outer ring member 21 is restricted.

As described above, when the main shaft 2 rotates in the forward direction, the second one-way clutch 20 transmits the force, which is caused by the rotation of the main shaft 2, to the input rotor 5, thereby rotating the drive shaft 41 of the power generator 4. However, when the main shaft 2 tries to rotate in the reverse direction, the second one-way clutch 20 restricts (precludes) the rotation of the main shaft 2.

In FIG. 1, when wind is weakened and a direction of the wind is changed to a reverse direction from a state where power is generated as the blades receive the wind that blows in one direction and the main shaft 2 rotates in the forward direction, the blades stop and then try to rotate in the reverse direction. When the blades try to rotate in the reverse direction, both the main shaft 2 and the output shaft 35 try to rotate in a direction opposite to the direction in which power is generated. In a case where the second one-way clutch 20 according to this embodiment is not provided, when the output shaft 35 starts rotating in the reverse direction, rotation speed of the input rotor 5, which is provided on the output shaft 35 so as to be rotatable together with the output shaft 35, becomes a negative value, and becomes lower than rotation speed of the output rotor 6. As a result, in the first one-way clutch 7 provided between the input rotor 5 and the output rotor 6, the input rotor 5 and the output rotor 6 are disconnected from each other. In this case, the blades, the main shaft 2, and the output shaft 35 rotate freely without restriction, which is mechanically unfavorable.

However, in the wind turbine generator 1 according to this embodiment, since the second one-way clutch 20 is provided, even when the main shaft 2 tries to rotate in the reverse direction, reverse rotation of the output shaft 35 associated with the rotation of the main shaft 2 is restricted, and thus the rotation of the main shaft 2 in the reverse direction is prevented. As a result, the blades, the main shaft 2, and the output shaft 35 do not rotate in the reverse direction. In other words, even when the main shaft 2 tries to rotate in the reverse direction, the output shaft 35 is restrained by the one-way clutch 20, and thus the rotation in the reverse rotation is prevented.

As described above, when the blades and the main shaft 2 stop and try to rotate in the reverse direction from a state where the blades and the main shaft 2 rotate in the forward direction, rotation speed of the input rotor 5 integrated with the output shaft 35 becomes lower than rotation speed of the output rotor 6 that rotates due to inertia, because the output shaft 35 is not rotating. Therefore, in the first one-way clutch 7 (see FIG. 4), the input rotor 5 and the output rotor 6 are disconnected from each other as the rollers 73 are disengaged. Thus, the drive shaft 41 and the rotor 42 of the power generator 4 are able to continue to rotate, and power is generated continuously.

In this embodiment, as shown in FIG. 1, the outer ring member 21 is fixed to the floor 26 through the bracket 25, the floor 26 being a structure at which the power generator 4 (or the speed increaser 3) is fixed and installed. Therefore, with the second one-way clutch 20, when the main shaft 2 tries to rotate in the reverse direction, it is possible to restrict the rotation, and it is possible to transmit force for restricting the rotation to the floor 26 through the bracket 25 at the time, the force occurring in the outer ring member 21. Therefore, it is possible to restrict the reverse rotation of the main shaft 2 safely without affecting other equipment. In this embodiment, the structure, to which the force for restricting the rotation is transmitted, is the floor 26. However, the structure is not limited to the floor 26, and the structure only needs to be a part of a main body of a wind turbine (such as a side wall of the power generator room).

Also, in this embodiment, the case has been described where the outer ring member 21 is provided radially outside the output shaft 35, and the second one-way clutch 20 is provided next to the first one-way clutch 7. However, the present invention is not limited to this. The outer ring member 21 may be provided radially outside any one subject shaft among the main shaft 2, the output shaft 35, and other rotative power transmission shafts (for example, the intermediate shaft 34) included in the speed increaser 3, and the outer ring member 21 may be disposed concentrically with the subject shaft. The rollers 22 may be provided in wedge-shaped spaces U formed between an outer peripheral surface of the subject shaft, and the respective cum surfaces 23 of the outer ring member 21.

However, in the speed increaser 3 having the gear mechanism 30, torque of the output shaft 35 becomes smaller than torque of the main shaft 2 and the other rotative power transmission shafts. Therefore, it is preferable that the outer ring member 21 be provided radially outside the output shaft 35 as in this embodiment. It thus becomes possible to restrict the rotation of the output shaft 35 with small force.

With the second one-way clutch 20 according to this embodiment, when the main shaft 2 tries to rotate in the reverse direction, it is possible to restrict the rotation promptly and safely. In a case where a configuration is employed in which, for example, a sensor (not shown), which detects reverse rotation of the main shaft 2 and the like, is installed instead of the one-way clutch 20 in this embodiment, and a braking device, which applies braking force to the output shaft 35 when the sensor detects reverse rotation of the main shaft 2 and the like, restricts the reverse rotation of the blades and the main shaft 2, braking force is applied to the output shaft 35 in a state where the output shaft 35 is rotating in the reverse direction. Therefore, large braking force is required because of inertia force of the output shaft 35. Further, in a case where sudden braking is applied, impulsive force acts as reaction (reaction force) on the braking device and a structure at which the braking device is fixed, for example, a floor. However, in this embodiment, the one-way clutch 20 includes the outer ring member 21 with the cum surfaces 23, and the rollers 22, and when the output shaft 35 tries to rotate in the reverse direction, the one-way clutch 20 restricts the reverse rotation. Since the one-way clutch 20 also functions as a damper, the impulsive force described above is not generated. In addition, it is not necessary to detect the reverse rotation by using a sensor in order to restrict the reverse rotation. When the blades and the main shaft 2 try to rotate in the reverse direction, the rollers 22 are engaged with the outer peripheral surface 35e of the output shaft 35, and the cum surfaces 23 of the outer ring members 21, and thus, the reverse rotation is restricted. Accordingly, it is possible to inhibit the reverse rotation of the blades and the main shaft 2 promptly.

The present invention is not limited to the foregoing embodiment, and may be implemented in embodiments appropriately modified. For example, in the embodiment, as shown in FIG. 3, the input rotor 5 and the output rotor 6 are provided on the output shaft 35 and the drive shaft 41, respectively, as separate members. However, the input rotor 5 and the output rotor 6 may be formed integrally with the output shaft 35 and the drive shaft 41, respectively. The output rotor 6 has a tubular shape, and the output rotor 6 is arranged radially outside the input rotor 5 concentrically with the input rotor 5. However, the output rotor 6 may have a shaft shape, the input rotor 5 may have a tubular shape, and the output rotor 6 may be arranged radially inside the input rotor 5 concentrically with the input rotor 5. In this case, in the first one-way clutch 7, cam surfaces may be formed in an inner peripheral surface of the input rotor 5.

In the foregoing embodiment (see FIG. 6), the reverse rotation prevention device is the outer-ring cum type one-way clutch 20 in which the cum surfaces 23 are formed in the inner peripheral surface of the outer ring member 21. However, in addition to the above outer-ring cum type one-way clutch 20, although not illustrated, an inner-ring cum type one-way clutch may be employed, in which the inner peripheral surface of the outer ring member 21 is a cylindrical surface, and cum surfaces are formed in an outer peripheral surface of the shaft (the output shaft 35) radially inside the outer ring member 21. However, the outer-ring cam type is structurally preferable, because the output shaft 35 continues to rotate at high speed with respect to the outer ring member 21 that is in a stationary state, during normal power generation.

As shown in FIG. 1, the roller bearing 39 that supports the output shaft 35 is provided outside the bracket 25. However, the roller bearing 39 may be provided inside the bracket 25. In other words, the roller bearing 39 may be provided adjacent to the second one-way clutch 20. In this case, the roller bearings 39 may be provided on respective sides of the one-way clutch 20. As shown in FIG. 3, the roller bearings 8 are arranged on respective axial sides of the first one-way clutch 7. However, the roller bearing 8 may be arranged only on one axial side. Further, the exemplary case has been described in which the power generation device according to this embodiment uses force of wind as external force. However, the present invention may be applied to a power generation device that generates power by using other external force such as tidal power, water power, and fire power.

In the power generation device according to the present invention, it is possible to effectively restrain smearing from occurring in the roller bearings that support the output shaft of the speed increaser.

What is claimed is:

1. A power generation device comprising:
    a main shaft rotated by external force;
    a speed increaser including a rotation transmission mechanism that increases speed of rotation of the main shaft, an output shaft that outputs rotation, speed of which has been increased by the rotation transmission mechanism, and a roller bearing that supports the output shaft so that the output shaft is rotatable;
    a power generator including a drive shaft that rotates when receiving the rotation of the output shaft as an input, and a rotor that rotates together with the drive shaft, the power generator generating power with rotation of the rotor;
    an input rotor provided on the output shaft so as to be rotatable together with the output shaft;
    an output rotor that is provided on the drive shaft so as to be rotatable together with the drive shaft, and that is arranged radially inside or radially outside the input rotor concentrically with the input rotor;
    a clutch that is arranged between the input rotor and the output rotor, connects the input rotor with the output rotor so that the input rotor and the output rotor are rotatable together with each other when the main shaft rotates in a forward direction and rotation speed of the input rotor is higher than rotation speed of the output rotor, and disconnects the input rotor and the output rotor from each other when the rotation speed of the input rotor is lower than the rotation speed of the output rotor; and
    a reverse rotation prevention device that is a one-way clutch and permits transmission of force, which is caused by the rotation of the main shaft, to the input rotor when the main shaft rotates in the forward direction, and precludes the rotation of the main shaft when the main shaft tries to rotate in a reverse direction,
    wherein the one-way clutch includes:
        an outer ring member that is provided radially outside any one subject shaft among the main shaft, the output shaft, and another rotative transmission shaft provided in the speed increaser, the outer ring member having an inner peripheral surface in which a plurality of cam surfaces is formed; and
        a plurality of rollers provided in wedge-shaped spaces formed between an outer peripheral surface of the subject shaft and the respective cam surfaces,
    when the main shaft tries to rotate in the reverse direction, the rollers are engaged with the outer peripheral surface of the subject shaft and the respective cam surfaces so that the rotation of the main shaft with respect to the outer ring member is precluded, and
    the outer ring member is fixed to a structure at which the power generator or the speed increaser is fixed and installed.

2. The power generation device according to claim 1, wherein the outer ring member is provided radially outside the output shaft.

* * * * *